United States Patent [19]

Burriss

[11] Patent Number: 4,615,597
[45] Date of Patent: Oct. 7, 1986

[54] CAMERA MOUNT FOR VEHICLES
[75] Inventor: John T. Burriss, Woodland Hills, Calif.
[73] Assignee: Stephen Brooks, III, Tarzana, Calif.; a part interest
[21] Appl. No.: 689,289
[22] Filed: Jan. 7, 1985
[51] Int. Cl.⁴ .............................................. G03B 17/00
[52] U.S. Cl. .................................... 354/293; 352/243; 352/132; 248/183
[58] Field of Search .................. 354/293, 81; 352/243, 352/132; 248/371, 183

[56] References Cited

U.S. PATENT DOCUMENTS

| | | | |
|---|---|---|---|
| 2,856,146 | 10/1958 | Lehder | 352/132 |
| 3,146,984 | 9/1964 | Mathews | 354/293 X |
| 3,176,602 | 4/1965 | Wilt | 354/293 X |
| 3,352,521 | 1/1966 | Tyler | 354/293 X |
| 3,515,472 | 6/1970 | Schwitzgebel | 358/108 |
| 3,586,278 | 6/1971 | Simons | 248/183 X |
| 3,689,695 | 9/1972 | Rosenfield et al. | 354/293 X |
| 3,752,376 | 8/1973 | Shelton et al. | 354/293 X |
| 3,833,196 | 9/1974 | Protzman | 354/293 X |
| 4,093,364 | 6/1978 | Miller | 352/132 |
| 4,301,955 | 11/1981 | DeFever | 354/293 |
| 4,420,238 | 12/1983 | Felix | 354/81 |

FOREIGN PATENT DOCUMENTS 2904665  8/1980  Fed. Rep. of Germany ...... 352/243

OTHER PUBLICATIONS

Norms Studio Equipment catalog, p. 22.

Primary Examiner—L. T. Hix
Assistant Examiner—Brian W. Brown
Attorney, Agent, or Firm—William P. Green

[57] ABSTRACT

A camera mount for supporting a camera at the outside of a vehicle, including two vertical guides along which two slides are movable upwardly and downwardly to differently adjusted levels and which carry a platform on which a camera can be mounted, with the platform being adjustable horizontally relative to the slides and having pivotal connections with the slides to facilitate adjustment of the platform without the possibility of a binding action. The device may be connected to a vehicle by two upper connector elements adapted to rest on the upper edge of a door frame, and two lower elements attached to vertically adjustable lower portions or structures of the device and engageable with the vehicle at a lower level. The lower structures have projections extending telescopically upwardly into the two vertical guides of the device, and have tubular elements projecting upwardly about coacting downwardly projecting elements of the upper portion of the device, in telescoping relation, with the lower vehicle contacting elements being slidably adjustable along this second telescopic assembly.

28 Claims, 10 Drawing Figures

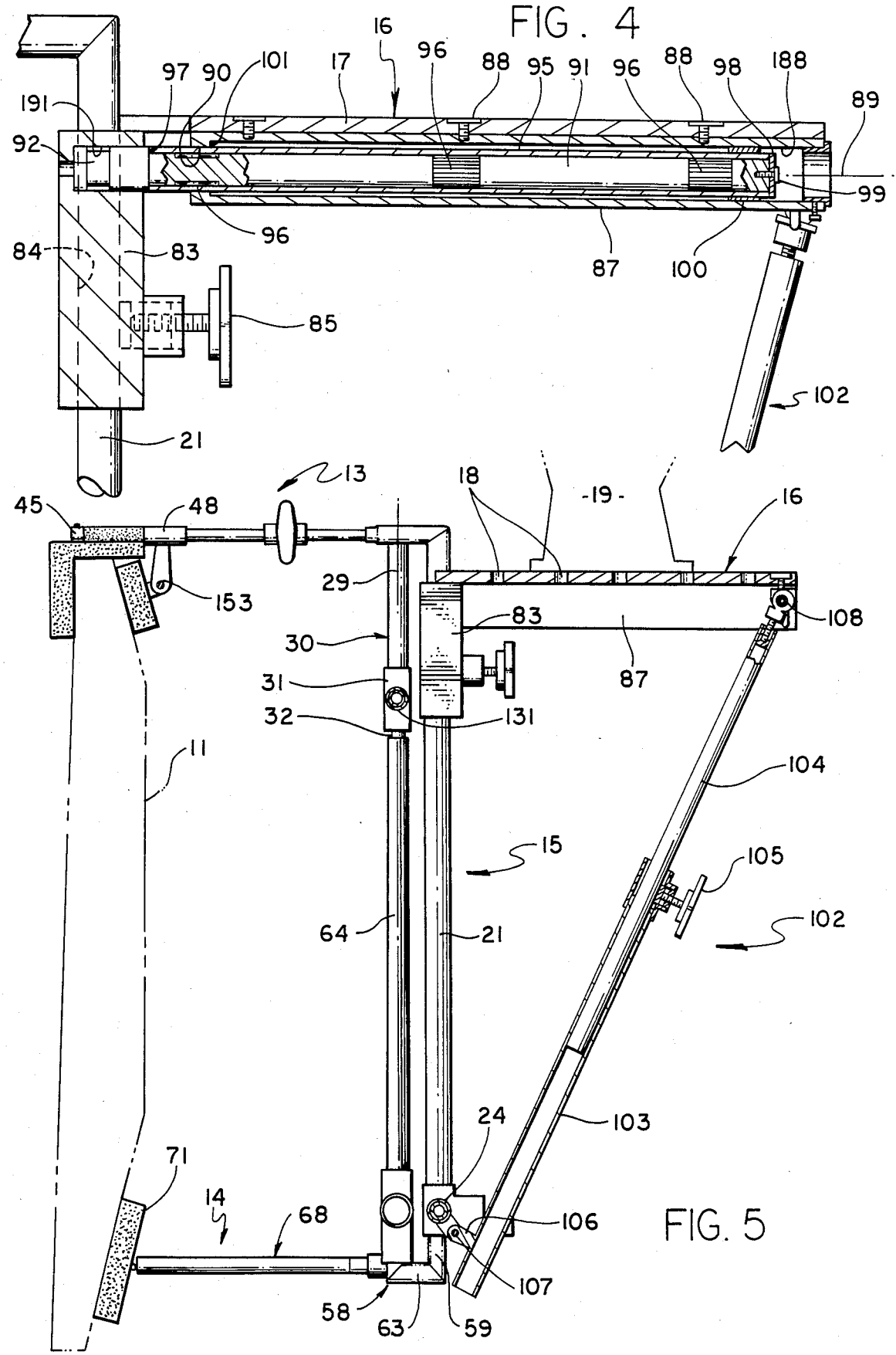

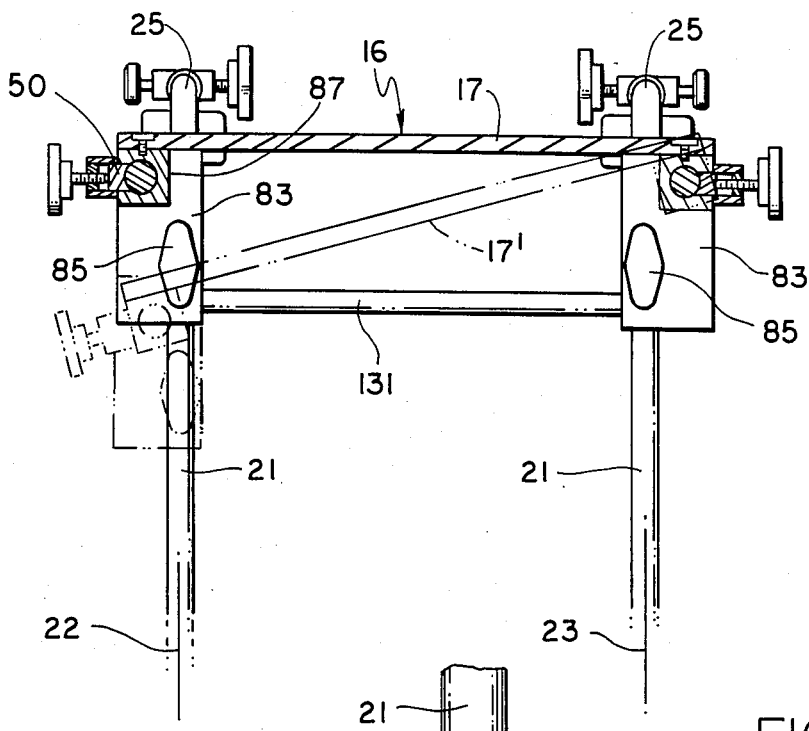
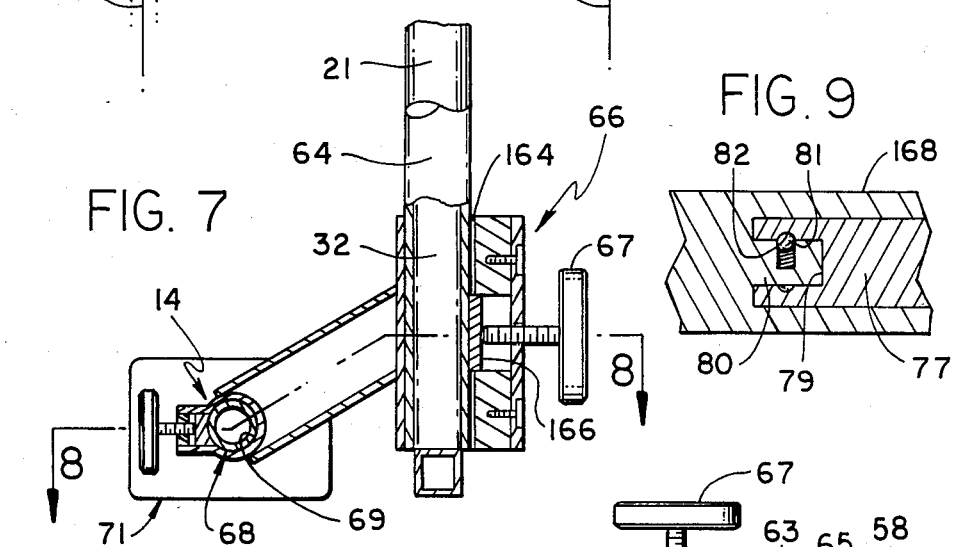
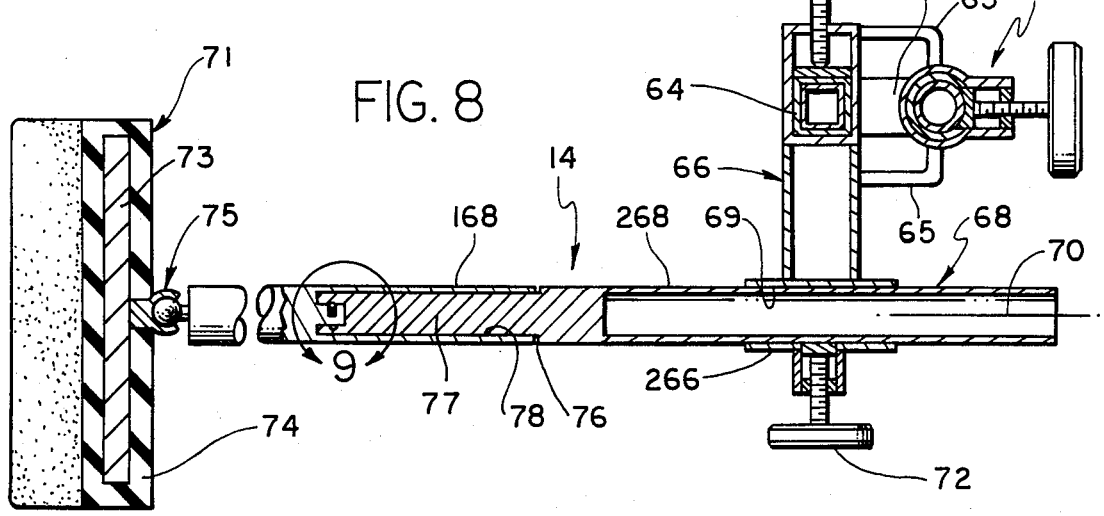

CAMERA MOUNT FOR VEHICLES

BACKGROUND OF THE INVENTION

This invention relates to improved camera mounts for supporting a camera at the outside of a vehicle.

In order to attain realism in motion picture and television productions involving moving automobiles, boats, or other vehicles, it is often essential that a camera be mounted directly on the vehicle, usually at the outside of the door adjacent the driver's seat, to either photograph persons within the vehicle, portions of the outside of the vehicle, or other nearby vehicles or environmental subject matter. Devices heretofore used for mounting a camera at such a location on a vehicle have usually been very difficult to attach to the vehicle, have in most instances had a tendency to damage the exterior surface of the vehicle, and have been extremely limited as to the number of positions in which a camera could be supported.

SUMMARY OF THE INVENTION

The major purpose of the present invention is to provide an improved mount which can support a camera at the outside of a vehicle in a number of different positions, enabling the effective photographing of subjects both within and outside of the vehicle, from any of a number of different levels and from different angles. Further a device embodying the invention is capable of being applied to a vehicle very quickly and easily, and yet in a rigid manner assuring positive retention of the camera in fixed orientation relative to the vehicle even under high speed conditions.

A camera mount embodying the invention includes a structure which is received at the outside of a vehicle, desirably adjacent the driver's seat door, and which forms two vertically extending guides along which a pair of slides are vertically adjustable, with a camera support being attached to these slides for upward and downward movement to different levels therewith. Thus, the camera can be mounted at eye level, or at a lower level to photograph for example the wheels of a vehicle during high speed travel, or at any of various different intermediate levels. The element to which the camera is connected is desirably a platform, which preferably has freedom for horizontal adjusting movement toward and away from the vehicle and relative to the slide to which it is attached. The platform also is free for pivotal movement relative to the slide, in a relation assuring against binding of the platform supporting connections during adjustment, and also enabling the platform to be shifted from a horizontal condition to any of various different inclined positions.

The upper end of the device may be attached to a vehicle by connectors engaging the upper edge of the vehicle door to support the device therefrom, with additional vehicle contacting connectors being located at the bottom of the device. A vertically adjustable structure may carry the lower vehicle contacting elements, and have a telescopically interfitting relation with the previously mentioned vertical guides, and with additional vertical members projecting downwardly from the top of the device. An inclined longitudinally extensible brace structure may be connected at its lower end to the two vertical guides and at its upper end to the underside of the platform, desirably by a universal connection.

BRIEF DESCRIPTION OF THE DRAWINGS

The above and other features and objects of the invention will be better understood from the following detailed description of the typical embodiment illustrated in the accompanying drawings in which:

FIGS. 3, 4 and 5 are vertical sections taken on lines 3—3, 4—4 and 5—5 respectively of FIG. 2;

FIG. 6 is a vertical fragmentary section taken on line 6—6 of FIG. 2;

FIG. 7 is an enlarged vertical section taken on line 7—7 of FIG. 3;

FIG. 8 is a horizontal section taken on line 8—8 of FIG. 3; and

FIG. 9 is an enlarged fragmentary detail view taken within the circle 9 of FIG. 8.

DESCRIPTION OF THE PREFERRED EMBODIMENT

Figure 1:
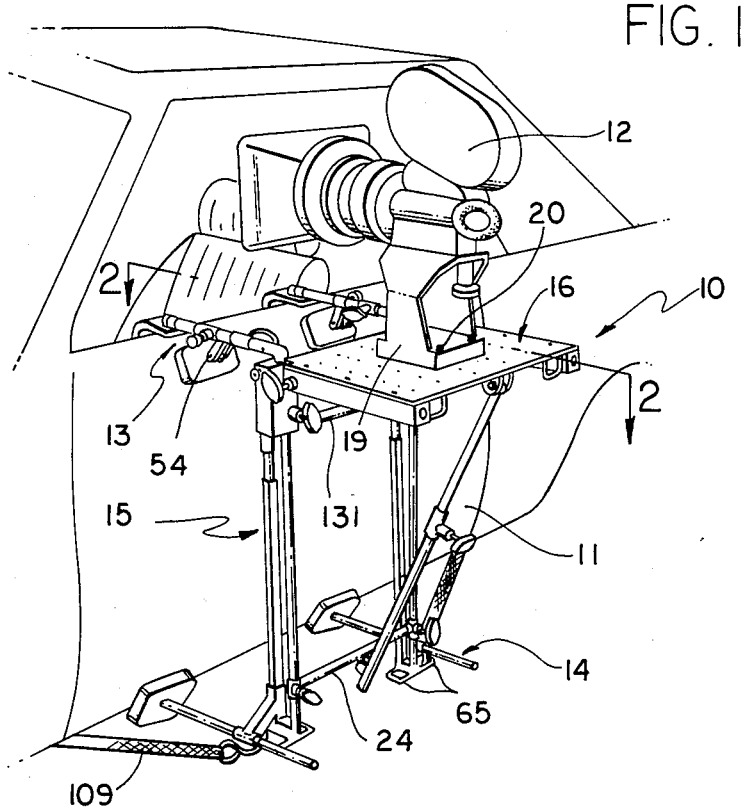
FIG. 1 is a perspective view showing a camera mount embodying the invention attached to the outside of the automobile.

A camera mount 10 embodying the invention is illustrated in FIG. 1 as mounted on the door 11 of an automobile or other motor vehicle, to support a television or motion picture camera 12 at a location adjacent the driver of the vehicle. The device includes two upper connector elements 13 for engaging the top edge of the door in supported relation, and two lower elements 14 for contacting the external surface of the door at a location beneath its upper edge. A structure 15 is mounted stationarily at the outside of the door, being connected near its upper and lower ends to the elements 13 and 14 respectively, and adjustably carries a platform or camera mount 16 on which camera 12 is supported. This camera mount may include a flat plate 17 containing a number of spaced openings 18 to which a base 19 of the camera is connected by appropriate screws or fasteners 20.

The structure 15 which is mounted stationarily at the outside of the vehicle includes two tubular guides 21 extending along parallel vertical axes 22 and 23 and preferably of internally and externally cylindrical configuration. At their lower ends, these guides 21 are rigidly interconnected by a horizontally extending rigid cross tube 24 appropriately welded or otherwise secured to guides 21. At their upper ends, guides 21 are welded or otherwise rigidly secured to two generally horizontally extending tubular elements 25 extending along axes 26 and 27 which are parallel to one another and generally horizontal and are perpendicular to axes 22 and 23 respectively and project inwardly toward the vehicle. Projecting downwardly along two additional axes 28 and 29 disposed parallel to axes 22 and 23 and perpendicular to axes 26 and 27, the elements 25 carry two externally cylindrical vertical members 30 which may be appropriately welded or otherwise secured rigidly to elements 25 and may be connected rigidly at their lower ends to a pair of elongated elements 32 extending along axes 28 and 29 and of externally square cross section transversely of those axes. Each element 32 may be attached at its upper end to a corresponding one of the elements 30, in alignment therewith, by a sleeve 31 having opposite ends disposed about elements 30 and 32 respectively and attached rigidly thereto as by welding, set screws or other fasteners as represented at 230, or the like. A horizontal cross piece 131 may extend between the two sleeves 31 and be welded or otherwise attached thereto to secure them rigidly in fixed relative positions.

Figure 3:
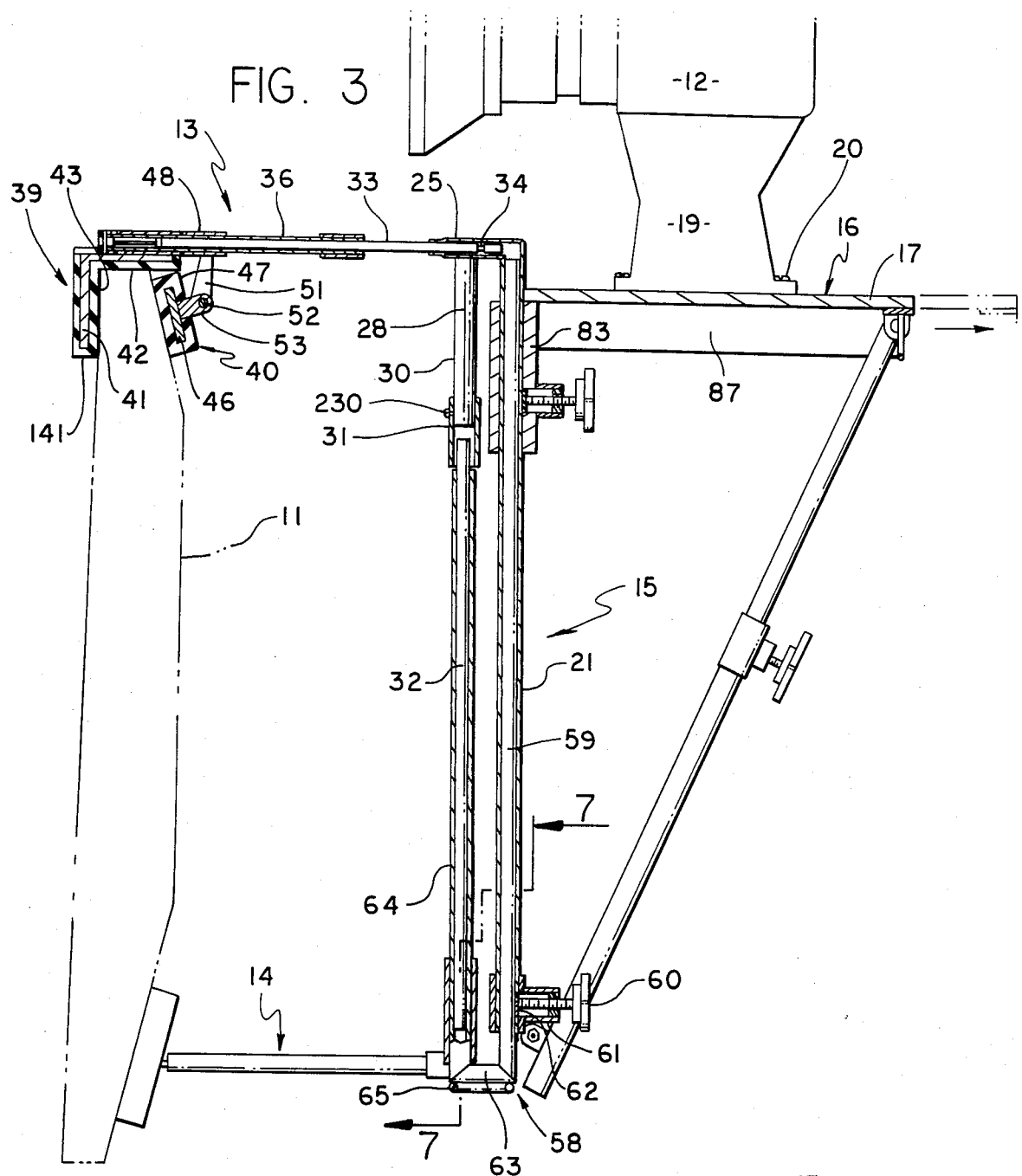
Figure 3A:
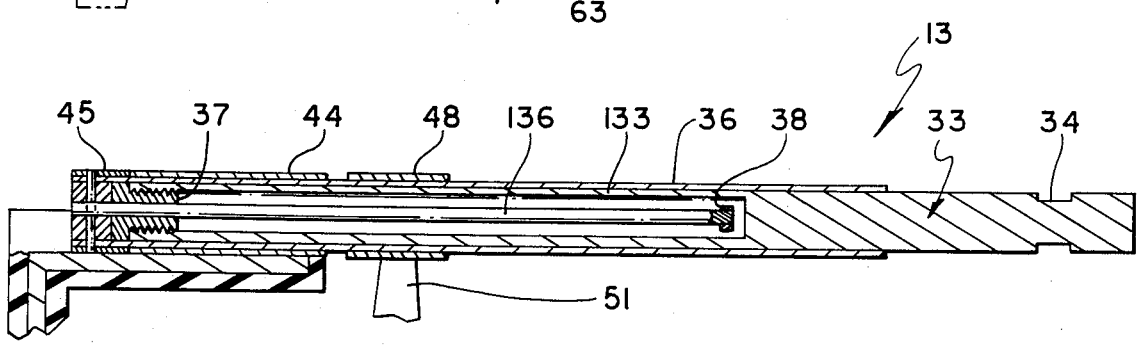
FIG. 3A is an enlarged fragmentary detail view corresponding to a portion of FIG. 3.

Each of the upper door contacting units 13 may form an adjustable assembly which is detachably connectable to a corresponding one of the upper elements 25 of the frame of the device. More particularly, each such unit 13 may include a shaft 33 (FIGS. 3 and 3A) which projects telescopically into one of the elements 25 and has an annular groove 34 near its inner end into which a screw 35 carried threadedly by an enlargement on element 25 is tightenable to lock shaft or rod 33 rigidly in fixed position relative to element 25. The unit 13 can be removed from element 25 by merely loosening screw 35 to withdraw it out of groove 34, and thus permit rod 33 and the connected parts to be telescopically withdrawn from element 25.

At its opposite end, the shaft or rod 33 projects into a tube 36 of unit 13 (FIG. 3A), being slidably movable within that tube to vary the length of the portion of rod 33 which projects beyond tube 36 and thus vary the extent to which the camera mount is spaced outwardly from the automobile door. Tube 36 carries at its left end as viewed in FIG. 3A a rod 136 which projects slidably through an opening in a plug 37 connected threadedly into the end of a tubular portion 133 of rod 33, and carries an enlargement 38 engageable with plug 37 to limit axial separating movement of parts 33 and 36 and thus prevent their disconnection one from the other.

For actually contacting the door, tube 36 carries two cushion elements 39 and 40, the first of which may take the form of an L-shaped rigid metal member 41 having a cushion 141 of resiliently deformable elastomeric material extending about all of its sides and particularly at its inner side to form a downwardly facing cushioning surface 42 engageable with the upper edge of the vehicle door to support the weight of the device thereon, and a generally vertical deformable cushion surface 43 for engaging the inner side of the upper portion of the door. The rigid reinforcing element 41 within this cushion assembly may be attached to a tube 44 disposed about and movable axially relative to an inner end portion of tube 36, with the leftward movement of tube 44 and cushion 39 relative to tube 36 being limited by engagement of tube 44 with an enlarged diameter end flange 45 on tube 36.

Figure 2:
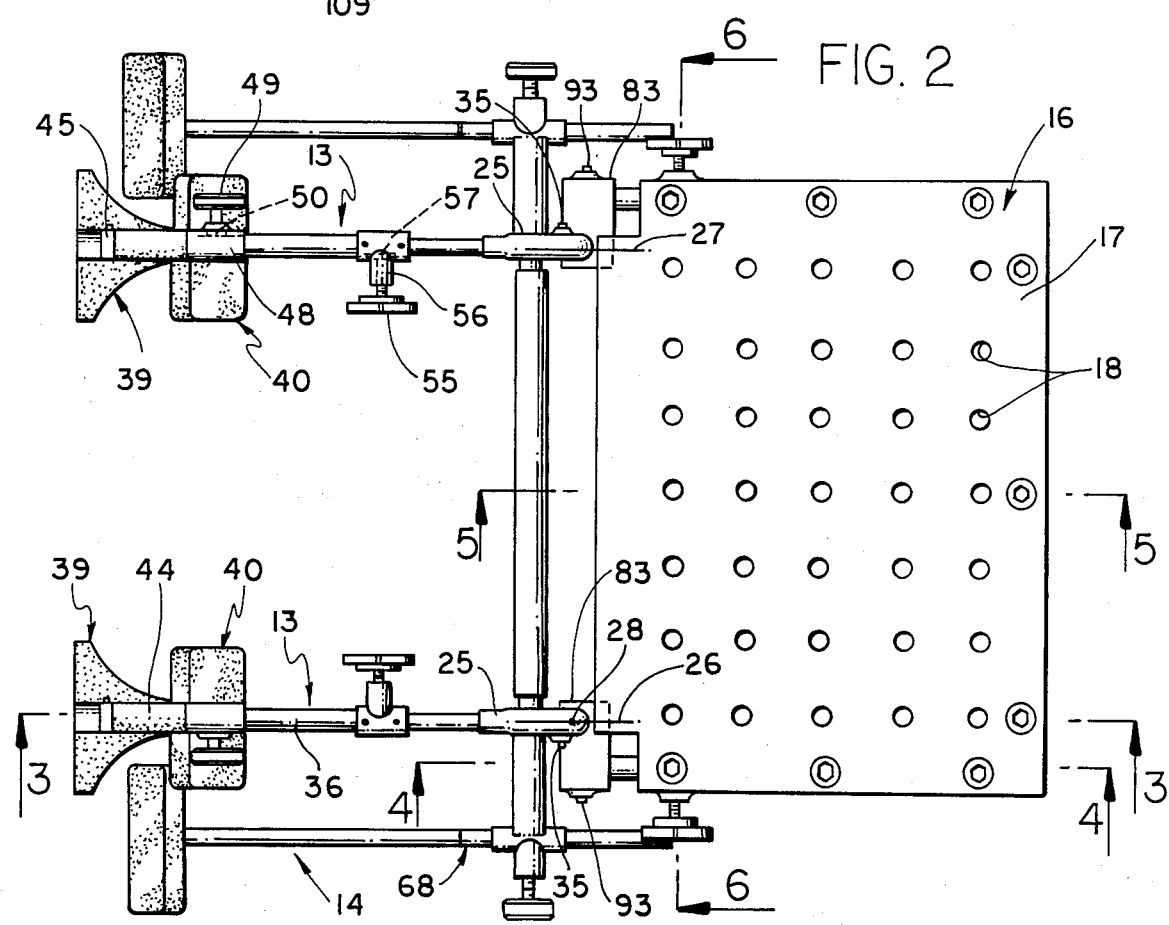
FIG. 2 is a top plan view taken on line 2—2 of FIG. 1.

The second cushion unit 40 may similarly be formed of a rigid inner reinforcing element 46 embedded within and covered on all sides by a layer of resiliently deformable elastomeric cushioning material 47. This second cushion 40 may be mounted by a tube 48 disposed about tube 36 and slidably adjustable longitudinally relative thereto to vary the spacing between the cushions 40 and 41 and thus effectively clamp the upper edge of the door between these cushions. This adjustment may be set by tightening of a hand actuable lock screw 49 connected threadedly to tube 48 and acting against a friction shoe 50 which upon threaded tightening of screw 49 relative to tube 48 is pressed against tube 36 to positively lock that tube and the carried cushion 40 in a fixed position. Cushion 40 may be adjustably connected to tube 48, as by providing that tube with a downwardly projecting arm 51 connected by a horizontal screw 52 to a rearwardly projecting connector lug 53 on member 46, to allow pivotal movement of cushion 40 relative to arm 51 and tube 36 about a horizontal axis 153. The nut 54 associated with the screw 52 can be tightened to lock the cushion in any set position relative to arm 51, so that the cushion 40 may engage the upper edge portion of the automobile door in an optimum relation. The adjustment of tube 36 axially relative to rod 33 is adapted to be locked in position by manual tightening of a screw 55 (FIG. 2) which threadedly engages a mounting lug 56 on tube 36 and acts to press a friction shoe 57 inwardly against shaft 33.

Each of the lower vehicle contacting units 14 is carried by a bottom structure 58 which is vertically adjustable relative to the upper portions of the apparatus previously described. Each of these bottom structures includes an upwardly projecting externally cylindrical element which extends upwardly into a corresponding one of the guides 21 in closely fitting telescopic relation and is movable upwardly and downwardly therein along its axis 22 or 23. Element 59 can be locked in any desired axial position relative to tube 21 by manual tightening of a screw 60 which may be connected threadedly to a fitting 61 disposed about and projecting laterally from the lower end of tube 21 and attached rigidly thereto. The screw acts when turned to press a friction shoe 62 inwardly against the vertically extending inner element 59 of the telescopic assembly. At its lower end, element 59 may be connected by a horizontal cross piece 63 to an upwardly projecting tubular element 64 which may be of internally and externally square cross section to fit closely about the externally square portion 32 of member 31 projecting downwardly from the top of the device, and to interfit telescopically therewith in a manner guiding element 64 for vertical adjusting movement relative to number 32, and thereby coact with the telescopic relation between the two parts 21 and 59 to guide lower structure 58 for vertical adjustment and maintain it in a fixed orientation with respect to the top of the device during upward and downward movement. Two rigid loops 65 may project in opposite directions from the cross piece 63 of each lower structure 58, for connection to straps which may be utilized in attaching the bottom of the device to a portion of the vehicle.

Each of the units 14 for contacting a lower exterior portion of the side of the vehicle door may include a mounting part 66 (FIGS. 7 and 8), taking the form of a slide received about a corresponding one of the externally square tubular elements 64 and having a passage 164 within part 66 of correspondingly square internal cross section to fit closely about tubular element 64 and guide part 66 for upward and downward movement along element 64 while preventing rotary movement of part 66 about the axis 28 or 29 of these parts. Element 66 may be locked in any desired position within its range of vertical movement by manual tightening of a lock screw 67 threadedly connected to a side of part 66 and acting to tighten a friction shoe 166 inwardly against element 64. Desirably, element 64 has a vertical length which is almost as great as the length of guide tubes 21, say at least about 75 percent of the length of guides 21, to assure a sufficient range of adjustability of the positioning of units 14.

In addition to the mounting part 66, each of the units 14 includes a rod 68 which is slidably received within a horizontally extending cylindrical bore 69 in a horizontal tubular portion 266 of the corresponding mounting part 66, to be shiftable relative thereto along the horizontal axis 70 of rod 68 and bore 69 and thereby vary the spacing of cushioning unit 71 from tubular element 64. The rod may be locked in any desired position by tightening of a manually actuated screw 72 relative to portion 266 of part 66, to tighten a coacting friction shoe against the rod. The cushioning unit 71 may have an inner rigid reinforcing plate portion 73 surrounded by deformable elastomeric cushioning material 74 for contacting the outer surface of the vehicle body without damage thereto. Part 73 may be connected to rod 68 by a universal connection 75, to enable the cushion to adjust automatically to a position for most effectively contacting the vehicle. Rod 68 may be formed in two sections 168 and 268 which are separable at a location 76 to enable the length of the rod to be changed for spacing of the camera carrying equipment different distances from the vehicle. The portion 268 of rod 68 may have an externally cylindrical reduced diameter portion 77 projecting into a tubular bore 78 in the end of section 168 of the rod, and containing a recess 79 in its inner end of square transverse cross section corresponding to the cross section of a coacting lug 80 carried by section 168. A spring pressed detent element 81 mounted to lug 80 may be engageable with any one of four detent notches 82 formed in the different sides of the square recess 79 in extension 268, to releasably retain the two sections together while permitting them to be pulled forcibly apart when desired.

Platform 16 is mounted to guides 21 for vertical and horizontal adjusting movement by two slides 83, (FIGS. 3, 4, 5 and 6) containing cylindrical generally vertical passages or bores 84 within which guides 21 are received and confined in a manner guiding slides 83 for movement essentially vertically along axes 22 and 23 relative to guides 21. The two slides may be moved upwardly and downwardly independently of one another, except as limited by their connection to platform 16, and each may be retained in any set vertical position by manual tightening of a lock screw 85 which is threadedly connected to the slide and acts inwardly against a friction block to tighten it against the outer surface of the coacting guide 21. The upper horizontal plate portion 17 of platform 16 has at its underside two parallel elongated mounting blocks 87 (FIGS. 4 and 6), secured to the plate 17 in appropriate manner as by screws represented at 88. Each of these blocks contains a cylindrical bore 188 extending along and centered about an axis 89 (FIG. 4), with a reduced diameter bore 90 being formed in an end portion of the block coaxial with bore 188. A shaft 91 extends through bore 90 and has an end projecting into and fitting closely within a horizontal bore 191 formed in the corresponding one of the two slides 83 to form a detachable connection between the shaft and slide. The shaft has at its end an annular groove 92 into which a lock screw 93 (FIG. 2) threadedly connected to the slide is tightenable to releasably secure the shaft and slide together. As will be understood, loosening of screw 93 by an appropriate allen wrench or other tool moves the screw out of groove 92 and allows the shaft to be pulled away from the slide 83, to thus disconnect the platform and connected parts from the two slides 83 for transportation or handling.

A tubular sleeve 95 is disposed rotatably about each of the shafts 91, with three series of needle bearings 96 being provided between these parts to assure very free rotation of the sleeve relative to the shaft. The sleeve may be retained axially by engagement at its left end as viewed in FIG. 4 against a shoulder 97 on the shaft, and by engagement at its right end with a washer or flange element 98 secured by a screw 99 to the shaft and projecting radially outwardly beyond the diameter of the shaft. A circular flange or head 100 carried about and secured rigidly to the sleeve 95 is engageable against a transverse annular shoulder 101 formed in block 87 at an end of bore 188 to limit the relative axial extension of the two parts 87 and 91 and thus limit the extent to which the platform can be shifted horizontally outwardly along shafts 91 and away from slides 83 (see broken lines in FIG. 3). As will be understood, the axes 89 of the two shafts 91 associated with the two blocks 87 at the underside of the platform are parallel to one another and essentially horizontal.

The outer edge portion of the platform is further supported by a brace assembly 102, which is rendered axially extensible by forming it of a tube 103 and an element 104 telescopically slidably received within the tube, with the length of the brace assembly being adjustable by tightening of a screw 105 carried threadedly by tube 103, to force a friction block against the outer surface of element 104 and thus retain element 104 in any set position relative to tube 103. At its lower end, tube 103 of the brace assembly is attached pivotally by a connection 106 to a central portion of cross piece 24 extending between the lower ends of guides 21. The pivotal axis 107 of this connection 106 is essentially horizontal, to allow the brace to swing between differently inclined positions in correspondence with the setting of the platform and other parts. At its upper end, element 104 of the brace assembly has a universal connection 108 with a transversely central portion of the underside of plate 17 of the platform 16, enabling the platform to be adjusted to either a horizontal position or any desired tilted or inclined position (FIG. 6) without interference by the brace assembly.

In mounting the device on a vehicle door or other structure, a user merely places the upper cushioned connector structures 13 over the upper edge of the vehicle door, and then allows the lower cushioned units 14 to engage lower portions of the door, to support the platform 16 in a generally horizontal position. The lengths of the units 13 and 14 may be adjusted as discussed to fit any door contour encountered, and to either locate the vertical guides 21 and connected parts closely adjacent the door or farther out, in vertical or inclined positions, or in any other setting which may be desirable in order to attain a particular positioning of a camera for certain photographic result. Slides 83 are adjusted upwardly and downwardly to locate the platform and camera either at an upper level to look directly into the vehicle and photograph its occupants, or at lower positions to photograph other parts of the vehicle or surrounding scenery or structures, such as the wheels of the vehicle for example. During vertical adjusting movement of the platform, the pivotal movement permitted between shafts 91 and the platform allows the slides to be adjusted without any tendency for binding of the connections between the slides and the vertical guides 21 or the connections between the slides and the platform. Also, if it is desired to position plate 17 of the platform at an inclination as illustrated for example in broken lines at 17' in FIG. 6, the permitted relative pivotal movement of the platform and shafts about axes 89 allows one of the slides to be moved downwardly to a lower level than the other slide and thus attain the desired inclination of the platform. Brace 102 is adjusted in correspondence with the movements of the platform to maintain the desired support of the platform regardless of its setting. The lower vehicle contacting cushioning units 14 are adjustable upwardly and downwardly by virtue of the permitted vertical sliding movement of these units along square tubular elements 64, to attain the most effective connection possible to the vehicle. Also, each of the bottom structures 58 may be adjusted vertically relative to the upper portion of the apparatus and relative to the other structure 58 by loosening one of the set screws 60 and adjusting the two upwardly projecting portions 59 and 64 of structure 58 telescopically and vertically relative to the coacting elements 21 and 32. After all of the adjustments have been made to properly fit the vehicle and properly locate the camera for a desired shot, the adjustments are locked in their proper settings by tightening of the various set screws as discussed. Also, if desired, the connection of the device to the vehicle can be supplemented by provision of straps 109 connected to the loops 65 at the bottom of the apparatus and attached to appropriate structures at the underside of the vehicle.

When the device is to be transported, it may be reduced in size by removing the upper and lower vehicle contacting units 13 and 14, as permitted by loosening of set screws 35 and 72. Further, the platform can be detached from slides 83 by loosening screws 93 and then pulling shafts 91 out of bores 191, and the platform can then be moved to a position in which it extends essentially parallel to the plane of axes 22 and 23 of guides 21, to thus render the entire apparatus much more compact for carrying.

While certain specific embodiments of the present invention have been disclosed as typical, the invention is of course not limited to these particular forms, but rather is applicable broadly to all such variations as fall within the scope of the appended claims.

I claim:
1. A camera mount comprising:
   two tubular guides secured together in parallel spaced relation;
   means for mounting said guides at a side of a vehicle in essentially vertically extending positions and spaced horizontally apart;
   said mounting means including upper vehicle contacting means connected to upper portions of said vertically extending guides and adapted to engage and be located by a first portion of the vehicle;
   two slides mounted on said two guides respectively and guided thereby for upward and downward adjusting movement relative thereto;
   a camera support carried by and movable upwardly and downwardly with said two slides and adapted to be attached to and carry a camera;
   two elongated members connected at their upper ends to said guides and projecting downwardly generally parallel thereto;
   two lower structures adjustable upwardly and downwardly relative to said guides and members;
   said lower structures including two elements projecting upwardly into and telescopically and slidably interfitting with said two tubular guides respectively for upward and downward sliding adjustment relative thereto, and two tubular members connected at lower ends to said two elements respectively and projecting upwardly about said two elongated members respectively and slidably and telescopically adjustable upwardly and downwardly relative thereto with said two elements; and two additional slides mounted on said two tubular members respectively of said lower structures and guided thereby for upward and downward sliding adjustment relative thereto;
   said mounting means including lower vehicle contacting means connected to said two additional slides and adjustable upwardly and downwardly therewith and adapted to engage and be located by the vehicle at a location spaced beneath said upper vehicle contacting means.

2. A camera mount as recited in claim 1, in which said upper vehicle contacting means include two units attached to upper portions of said two tubular guides and adapted to fit over and be supported by an upper edge of a vehicle door at spaced locations.

3. A camera mount as recited in claim 2, in which each of said units includes two cushioned elements for engaging opposite sides of said door, and means mounting said two cushioned elements for adjusting movement toward and away from one another to fit different doors.

4. A camera mount as recited in claim 2, including means mounting said units for movement horizontally toward and away from said tubular guides to vary the spacing of said guides from the vehicle.

5. A camera mount as recited in claim 1, in which said upper vehicle contacting means includes two units attached to upper portions of said tubular guides and adapted to fit over and be supported by an upper edge of a vehicle door at spaced locations, each of said units including an elongated rod connected to one of said tubular guides and projecting essentially horizontally therefrom, a tube disposed about said rod and telescopically adjustable axially relative thereto, a first cushioned element carried by said tube and engageable with a first side of said upper edge of the vehicle door, a second cushioned element for engaging the opposite side of said upper edge of the vehicle door, and a tubular part carrying said second cushioned element and mounted slidably and adjustably about said tube to vary the spacing between said two cushioned elements.

6. A camera mount as recited in claim 5, including means for connecting said rod of each of said units detachably to the upper end of a corresponding one of said tubular guides.

7. A camera mount as recited in claim 5, in which each of said units includes an elongated element connected to said tube and projecting therefrom into the interior of said rod and having a shoulder engageable with a shoulder carried by the rod to limit axial movement of the tube relative to the rod.

8. A camera mount as recited in claim 1, including two bearings connecting said camera support at spaced locations to said two first mentioned slides respectively for pivotal movement relative thereto about two spaced generally horizontally extending essentially parallel axes.

9. A camera mount as recited in claim 1, including two bearing structures connecting said camera support at spaced locations to said two first mentioned slides respectively for pivotal movement relative thereto about two spaced generally horizontally extending essentially parallel axes and for axial movement along said axes to shift said camera support toward and away from the locations of said vertically extending guides.

10. A camera mount as recited in claim 9, in which each of said bearing structures includes an elongated shaft extending along one of said generally horizontally extending axes, a tubular sleeve disposed about said shaft and mounted thereby for rotation relative to the shaft about said one generally horizontally extending axis, and a structure attached to said camera support and received about said tubular sleeve and mounted thereby for rotary movement about said one generally horizontally extending axis and for longitudinal sliding movement along said one generally horizontally extending axis.

11. A camera mount as recited in claim 10, including means for detachably connecting said shaft of each of said bearing structures to one of said first mentioned slides.

12. A camera mount as recited in claim 1, including two bearing structures connecting said camera support at spaced locations to said two first mentioned slides for pivotal movement relative to said first mentioned slides about two spaced generally horizontally extending and generally parallel axes, and for movement horizontally along said axes, a brace assembly connected at a lower end to said tubular guides and extending at an inclination upwardly and connected at an upper end to said camera support, said brace assembly being extensible to different lengths to brace the camera support in a generally horizontally extending condition in different positions of adjustment of the camera support along said two generally horizontally extending axes.

13. A camera mount as recited in claim 1, in which said two tubular members of said lower structures have internal surfaces of noncircular horizontal section slidably engaging external surfaces of said two elongated members of similar noncircular horizontal section, and have external surfaces of noncircular horizontal section slidably engaging internal surfaces of noncircular horizontal section of said additional slides to maintain the additional slides and said tubular members of said lower structures in predetermined orientation with respect to said two elongated members.

14. A camera mount as recited in claim 1, in which said two elongated members and said two tubular members of said lower structures and said two additional slides have slidably engaging portions of essentially square horizontal cross-section.

15. A camera mount as recited in claim 1, in which said lower vehicle contacting means include two cushioned members for engaging the vehicle and connected to said two additional slides respectively for adjusting movement toward and away from said additional slides.

16. A camera mount as recited in claim 1, in which said lower vehicle contacting means include two cushioned members for engaging said vehicle at spaced locations, and elongated rods for carrying said cushioned members and connected slidably to said two additional slides respectively to adjust the cushioned members toward and away from said additional slides.

17. A camera mount as recited in claim 16, in which said rods have first portions and extensions detachably connectible thereto to vary the effective lengths of the rods.

18. A camera mount as recited in claim 1, in which said upper vehicle contacting means include two units attached to upper portions of said tubular guides and adapted to engage and be supported by an upper edge portion of a vehicle door, said lower vehicle contacting means including two vehicle contacting elements connected to and projecting inwardly from said two additional slides respectively, there being two bearing structures connecting said camera mount to said two first mentioned slides respectively for pivotal movement relative to said first mentioned slides about two generally horizontally extending axes and for movement relative to the slides essentially along said generally horizontally extending axes, and an extensible brace connected at a lower end to said tubular guides and at an upper end to said camera mount and which is extensible longitudinally, said two elongated members and said two tubular members of said lower structures and said two additional slides having slidably engaging portions of noncircular horizontal section.

19. A camera mount comprising:
two elongated guides secured together in parallel spaced relation;
means for attaching said guides removably to a vehicle in essentially vertically extending positions at a side of the vehicle and spaced horizontally apart;
two slides mounted on said two guides respectively and guided thereby for upward and downward adjusting movement relative thereto;
a camera support carried by and movable upwardly and downwardly with said slides and adapted to be attached to and carry a camera; and
two bearing structures connecting said camera support at spaced locations to said two slides respectively for pivotal movement of the camera support relative to the slides about two axes which extend generally horizontally and are retained in parallel relation as the camera support pivots relative to said slides.

20. A camera mount as recited in claim 19, in which said bearing structures mount said camera support for movement axially along said spaced parallel axes in addition to said pivotal movement about said axes.

21. A camera mount as recited in claim 19, in which each of said bearing structures includes an elongated shaft extending along one of said parallel axes, a tubular sleeve disposed about said shaft and mounted thereby for rotation relative to the shaft about said one of the axes, and a structure attached to said camera support and received about said tubular sleeve and mounted thereby for rotary movement about said one of the axes and for longitudinal sliding movement along said one axis.

22. A camera mount as recited in claim 21, including means for detachably connecting said shaft of each of said bearing structures to one of said first mentioned slides.

23. A camera mount as recited in claim 19, including means for securing said bearing structures to said two slides detachably to enable separation of the bearing structures from the slides for transportion of the camera mount.

24. A camera mount as recited in claim 19, in which said bearing structures mount said camera support for movement essentially horizontally along said parallel axes relative to said slides in addition to said relative pivotal movement, there being a brace assembly connected at a lower end to said two guides and extending at an inclination upwardly, a connection attaching said camera support to an upper end of said brace assembly for relative universal movement, said brace assembly being extensible to different lengths to brace the camera support in a generally horizontally extending condition in different positions of adjustment of the camera support along said two parallel axes.

25. A camera mount comprising:

a first pair of elongated guides secured together in parallel spaced relation;

a second pair of elongated guides parallel to and spaced from said guides of the first pair respectively;

means for mounting said two pairs of elongated guides at a side of a vehicle in essentially vertically extending positions and spaced horizontally apart;

said mounting means including upper vehicle contacting means connected to said guides and adapted to engage and be located by a first portion of the vehicle;

a first pair of slides mounted on said first pair of elongated guides respectively and guided thereby for upward and downward adjusting movement relative thereto;

a camera support carried by and movable upwardly and downwardly with said first pair of guides and adapted to be attached to and carry a camera;

a second pair of slides mounted on said second pair of elongated guides respectively and guided thereby for upward and downward sliding adjustment relative thereto;

said mounting means including lower vehicle contacting means connected to said second pair of slides and adjustable upwardly and downwardly therewith and adapted to engage and be located by the vehicle at locations spaced beneath said upper vehicle contacting means.

26. A camera mount as recited in claim 25, in which said two pairs of guides and said two pairs of slides are constructed to enable sliding movement of said second pair of slides carrying said lower vehicle contacting means to positions higher than and lower than said first pair of slides carrying said camera support.

27. A camera mount as recited in claim 26, in which said upper vehicle contacting means includes two units attached to upper portions of said first pair of guides and adapted to fit over and be supported by an upper edge of a vehicle door at spaced locations.

28. A camera mount as recited in claim 25, including a first pair of elongated members interfitting telescopically and slidably with said first pair of guides, and a second pair of elongated members interfitting telescopically and slidably with said second pair of guides respectively.

* * * * *